United States Patent [19]

Gotchel et al.

[11] Patent Number: 4,682,942

[45] Date of Patent: Jul. 28, 1987

[54] DRY FORMED-WEB EMBOSSING APPARATUS

[75] Inventors: Joel P. Gotchel, Glen Mills, Pa.; Henry J. Norton, Wilmington, Del.; Rudolf Neuenschwander, Swarthmore; Daniel J. Stango, Newtown Square, both of Pa.

[73] Assignee: Scott Paper Company, Philadelphia, Pa.

[21] Appl. No.: 764,907

[22] Filed: Aug. 12, 1985

[51] Int. Cl.[4] .......... B29C 59/02

[52] U.S. Cl. .......... 425/103; 162/362; 425/363; 425/373; 425/385; 425/388; 264/119; 264/284

[58] Field of Search .......... 425/363, 373, 383, 388, 425/405 R, 90, 102, 83.1, 103, 385; 264/280, 284, 118, 119; 156/167, 181, 219, 285, 290, 622; 226/91, 95 X; 162/306, 362

[56] References Cited

U.S. PATENT DOCUMENTS

| | | | |
|---|---|---|---|
| 389,949 | 9/1888 | Baker | 101/23 |
| 2,803,577 | 8/1957 | Colt et al. | 264/119 |
| 2,862,251 | 12/1958 | Kalwaites | 264/119 |
| 2,915,787 | 12/1959 | Ewing et al. | 264/284 |
| 3,088,859 | 5/1963 | Smith | 264/119 |
| 3,862,472 | 1/1975 | Norton et al. | 19/145.5 |
| 4,087,319 | 5/1978 | Linkletter | 162/362 |
| 4,135,024 | 1/1979 | Callahan | 156/181 |
| 4,207,367 | 1/1980 | Baker | 428/171 |
| 4,452,669 | 6/1984 | Koski et al. | 162/306 |

FOREIGN PATENT DOCUMENTS

| | | | |
|---|---|---|---|
| 1901450 | 6/1970 | Fed. Rep. of Germany | 162/306 |
| 2710000 | 9/1978 | Fed. Rep. of Germany | 425/373 |

*Primary Examiner*—Willard E. Hoag

*Attorney, Agent, or Firm*—Joseph H. Yamaoka; John W. Kane, Jr.

[57] ABSTRACT

A dry-formed web is transferred at speeds in excess of 300 feet per minute onto a stable, porous, endless belt and both the dry-formed web and the belt are conveyed through the embossing nip. The combination of the dry-formed web and the belt are guided into the embossing nip so that the web and belt partially wraps the embossing roll before entering the embossing nip. As the embossing roll contacts the web, some of the air in the web is forced through the porous belt.

18 Claims, 4 Drawing Figures

10
12
DRIVE

DRY FORMED-WEB EMBOSSING APPARATUS

TECHNICAL FIELD

This invention relates to an apparatus for manufacturing a nonwoven fabric and more particularly to an apparatus for transferring and conveying a dry-formed nonwoven web through an embossing nip.

BACKGROUND

A typical apparatus for dry-forming a fibrous sheet is disclosed in U.S. Pat. No. 3,862,472, issued to Henry J. Norton, et al., assigned to the assignee of this invention. In Norton, et al., the fibrous web is formed on a foraminous endless conveyor. As disclosed in U.S. Pat. No. 4,207,367, issued to John H. Baker, Jr., assigned to the assignee of the subject invention, the dry-formed web of the Norton, et al. patent is transferred to a conveyor that transports the web to a spray station where the web is moistened. The moistened web is then removed from the spray conveyor and passed through an embossing nip. In the prior art, as represented by U.S. Pat. No. 4,207,367, the formed fibrous sheet is not supported as it is transferred from the forming conveyor onto the spray conveyor. As those skilled in the art would say, the web travels over an "open draw". Also, in the prior art, as represented by the U.S. Pat. No. 4,207,367, the transfer of the web from the spray conveyor into the embossing nip is made over an open draw. One of the major problems in trying to increase the speed of manufacturing such an embossed, dry-formed web is that because the web does not have great strength, it will quite often break at the open draw into the embossing nip. It has further been found that if the embossing speed is increased by conveying the web through the embossing nip, further speed increases are limited by the increased tendency for the web to break at the open draw to the spray conveyor.

U.S. Pat. No. 389,949, issued to J. M. Baker, describes an embossing machine in which an embossing roll B forms an embossing nip with an anvil roll D which can have a resilient surface. As stated at lines 52–55, an endless, non-porous elastic belt, L, of soft rubber or other appropriate material is passed over pulleys KK and the roller D so as to pass through the embossing nip. As further stated at lines 89–93, the material to be embossed rides on the belt L as it passes under the embossing roll B.

U.S. Pat. No. 4,038,917, issued to John DeLigt, also discloses embossing a web while it is on a non-porous, resilient film as it passes through an embossing nip formed by an embossing roll and an anvil roll.

There are several problems with embossing web dry-formed on a non-porous, elastic belt as described in the prior art patents to J. M. Baker and John DeLigt. When the dry-formed web and the belt enter the embossing nip at high speeds, the embossing roll begins to squeeze the air within the web out of the web. Since the belt is non-porous, the air being squeezed out of the web cannot pass through the belt so it lifts the web from the belt to form a pocket or a bubble from which air escapes through the web. A further problem with an elastic belt, such as the rubber belt of J. M. Baker or the resilient belt of DeLigt, is that any forces on the belt in the vicinity of the embossing nip which cause stretching of the belt in either the cross or machine direction will result in forces exerted on the web in the cross and machine directions, which in the case of weak, dry-formed webs, acts to separate fibers in the web which tends to fracture the web.

It is one object of this invention to eliminate the open draw transfer of a dry-formed web into an embossing nip at relatively high speeds.

Another object of the invention is to provide apparatus for assisting the transfer of a dry-formed web over the open draw between a first conveyor and a second conveyor.

DESCRIPTION OF THE INVENTION

In the embossing apparatus of this invention, a dry-formed web is transferred at speeds in excess of 300 feet per minute onto a stable, porous, endless belt and both the dry-formed web and the belt are conveyed through the embossing nip. The combination of the dry-formed web and the belt are guided into the embossing nip so that the web and belt partially wraps the embossing roll before entering the embossing nip. As the embossing roll contacts the web, some of the air in the web is forced through the porous belt. In one preferred embodiment, the anvil roll has a resilient surface. In another preferred embodiment, the embossing roll is mounted with respect to the anvil roll so that the web and the belt passes directly under the center of the embossing roll before passing directly over the center of the anvil roll.

In another aspect of this invention, there is provided means for assisting the transfer of the web onto the stable, porous, endless belt. Prior to being transferred to the endless belt, the web is traveling on a conveyor and is transferred from the conveyor to the endless belt. This transfer occurs at a solid exit turning roll located in the proximity of an entrance turning roll guiding the porous belt. Mounted adjacent to the exit turning roll and the entrance turning roll is a transfer roll. Mounted within the transfer roll is a vacuum box, the incoming edge of which is preferably located so that it will attract the dry-formed web to the transfer roll before the web and the conveyor reaches the nip line between the transfer roll and the exit turning roll. The outgoing edge of the vacuum box mounted within the turning roll is preferably located so that the web passes by the vacuum source just before or as it passes over the line joining the centers of the transfer roll and the entrance turning roll mounted within the porous belts. The entrance turning roll of the belt also contains a vacuum box having an incoming edge that is preferably located so as to pull air into the vacuum box before the web reaches the entrance turning roll and having an outgoing edge located so that air is pulled into the vacuum box after the web and the belt leave the surface of the entrance turning roll.

In another aspect of the invention, there is provided means for cleaning the endless belt comprising air nozzles for directing air under pressure to expel any fibers which may become entrapped within the pores of the belt. Means, such as a rotating brush, can also be located outside of the belt to remove any fiber particles or dust which may be on the outer, conveying surface of the belt.

BRIEF DESCRIPTION OF THE DRAWINGS

While the specification concludes with claims particularly pointing out and distinctly claiming that which is regarded as the present invention, the objects and advantages of this invention can be more readily ascertained from the following description of a preferred embodiment when read in conjunction with the accompanying drawings in which:

BEST MODE FOR CARRYING OUT THE INVENTION

Figure 1:
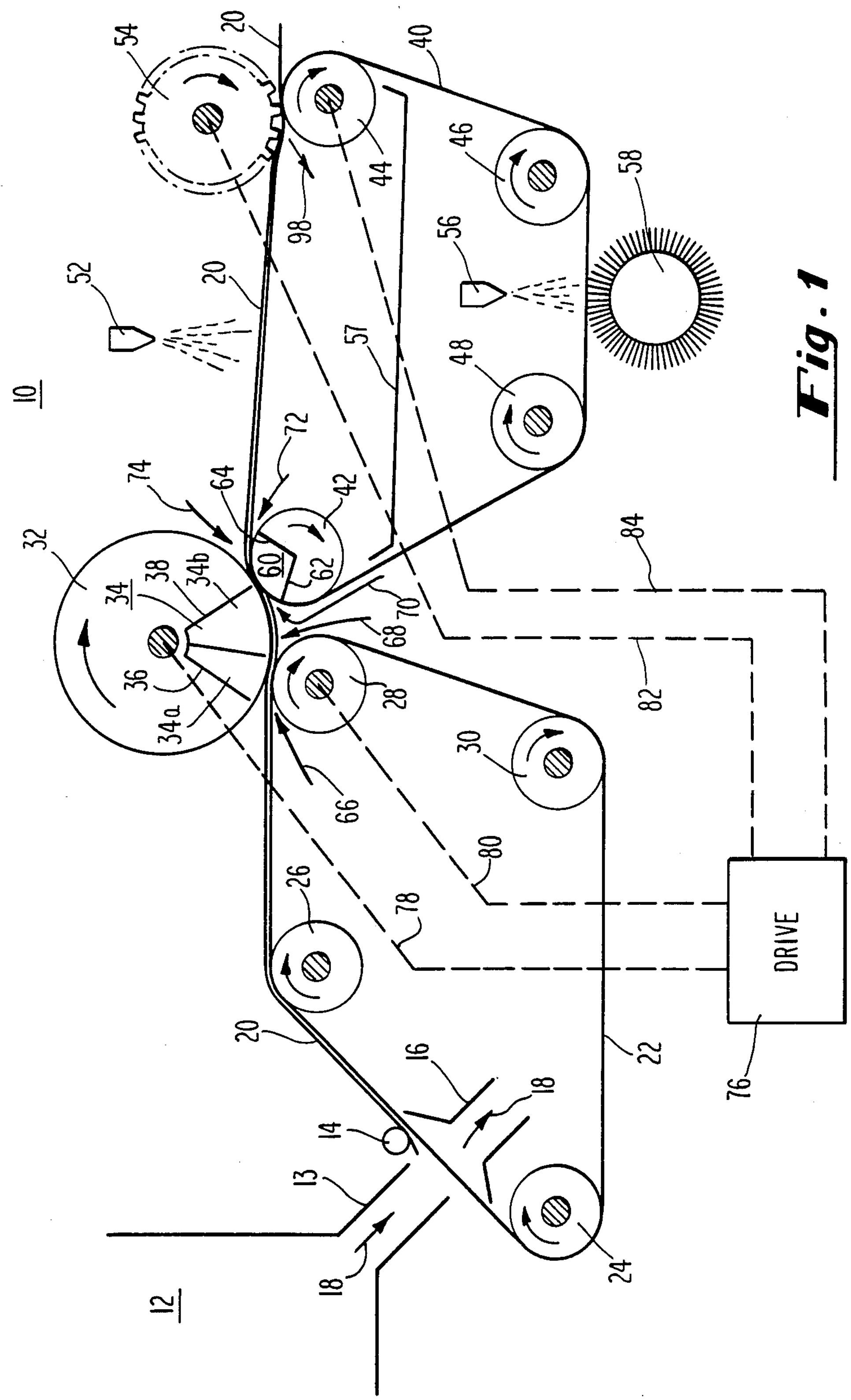
FIG. 1 is a schematic view of an apparatus for forming and conveying a dry-formed web through an embossing nip.

FIG. 1 is a schematic block diagram of the apparatus 10 for transferring and conveying a dry-formed web 20 through an embossing nip in accordance with this invention. For the sake of convenience, an element depicted in more than one figure will retain the same element number in each figure. In FIG. 1, there is shown an apparatus 12 for dry-forming a fibrous web. The transfer, conveying and embossing apparatus of this invention is really independent of how the dry-formed web is made. Thus, it will be apparent to those skilled in the art that the dry-forming apparatus 12 can be either an air-lay web-forming process or a carded web-forming process. Although the web being formed in this embodiment was a blend of a major proportion of short fibers (wood pulp), having a length of less than one-quarter inch and a minor proportion of long fibers (polyester) having a length greater than one-quarter inch, this invention is believed applicable to other blends and to dry-formed webs consisting entirely of short fibers or long fibers.

In one preferred embodiment, the dry-forming apparatus 12 has a configuration as generally described in U.S. Pat. No. 3,862,472, issued to Henry J. Norton and Brian E. Boehmer. As described in the Norton, et al. patent, fibers are deposited on a foraminous conveyor 22. A vacuum box 16 located within the foraminous conveyor 22 pulls air, as depicted by arrow 18, mixed with separated fibers through forming duct 13. As the air passes through the forming conveyor 22, the fibers are deposited on the surface of the forming conveyor 22 and emerges from under the turning roll 14 as a dry-formed fibrous web 20. The forming wire 22 is an endless belt conveyor that passes over turning rolls 24, 26, 28 and 30. The turning roll 28 is a solid roll and for the purposes of this description is called an exit turning roll because as the formed web 20 travels over the exit turning roll 28, it is transferred off of the forming conveyor 22 onto a very stable, porous endless belt 40. The path of endless belt 40 is defined by turning roll 42, anvil roll 44, and turning rolls 46, 48. For the purposes of this description, the turning roll 42 is called an entrance turning roll because the web 20 is transferred onto the belt 40 as it passes over the turning roll 42. As the formed web 20 and the porous belt 40 leave the entrance turning roll 42, it passes under a spray station 52 for applying water to the web. In one preferred embodiment water is added to the web so that it contains about 30% moisture by weight. After the web is moistened, both the web 20 and the belt 40 are conveyed through an embossing nip formed by a heated embossing roll 54 and the anvil roll 44. In a preferred embodiment, the tempeature of the embossing roll is about 400° F. and the embossing pressure runs as high as 400 pli. As the embossed web 20 leaves the embossing nip, it is separated from the porous belt 40 and is allowed to travel to the next step in the process.

It is necessary to prevent fibers from building up within and clogging the pores 41 in the belt. Thus, there is providing means for cleaning the pores 41 of the belt 40 consisting of nozzle means 56 located inside of the run of belt 40 which directs air under pressure at the pores 41 so as to drive out any fibers or dust which may be otherwise trapped within the pores 41. Additional means, such as a rotating brush 58, can also be employed for cleaning the conveying surface of the belt 40. It has also been found desirable to place a shield 57 within the run of belt 40 which prevents fibers, which may come through the upper run of the belt, from settling onto the inner surface of the lower run of the belt 40. Fibers or other debris which may accumulate on the shield 57 can be removed from the open sides of the belt 40 run.

It has also been found desirable to assist the transfer of the formed web 20 across the open draw between the exit turning roll 28 located within conveyor 22 and the entrance turning roll 42 located within the belt 40. This transfer assistance is provided by means of a rotating transfer roll 32 located in very close proximity to the exit turning roll 28 located within the conveyor 22 and the entrance turning roll 41 located within the belt 40. Located within the transfer roll 32 is a vacuum box 34. The vacuum box 34, by pulling air 68 through the web causes the web 20 to be transferred from conveyor 22 onto the surface of transfer roll 32. The vacuum box 34 generally spans an arc defined by where the formed web 20 first approaches the transfer roll 32 and where the formed web 20 leaves the transfer roll 32, and in a preferred embodiment includes a high vacuum section **34*a* and a low vacuum section 34*b*. It is preferred to locate the incoming edge 36 of vacuum box 34 so that the vacuum box 34 will begin to have an effect on the fibrous web 20 before the fibrous web 20 actually reaches the line extending between the center of the exit turning roll 28 and the center of the transfer roll 32. Because of the location of the incoming edge 36 of vacuum box 34, air, as indicated by arrow 66, located within the conveyor 22 and adjacent to the solid exit turning roll 28 is pulled through the foraminous conveyor 22 into the vacuum box 34 thereby assisting the transfer of the fibrous web from the foranimous conveyor 22 to the surface of transfer roll 32. It is preferred to locate the outgoing edge 38 of vacuum box 34 so that the web passes by the outgoing edge 38 of vacuum box 34 just before or as it passes over the nip line extending between the center of the transfer roll 32 and the center of the entrance turning roll 42. The turning roll 42 also has a vacuum box 60 having an incoming edge 62 and outgoing edge 64. One purpose of the vacuum box 60 is to pull air 74 through the web 20 and the belt 40 to help transfer the fibrous web 20 from the surface of the transfer roll 32 onto the surface of belt 40. It is desirable to locate the incoming edge 62 of the vacuum box 60 so that the actual transfer of the web 20 from the transfer roll 32 to the belt 40 occurs beyond the incoming edge 62 of the vacuum box 60. This allows the vacuum box 60 to remove air as represented by the arrow 70 that is being carried along the surface of belt 40 into the nip formed by the transfer roll 32 and the entrance turning roll 42. It is also desirable to locate the outgoing edge 64 of the vacuum box 60 so that the belt 40 leaves the vacuum box 60 before it reaches the outgoing edge 64 of the vacuum box 60. This allows the vacuum box 60 to remove air and fibers as indicated by the arrow 72 from within the belt 40. It is preferred that the width of both vacuum boxes 34, 60 are greater than the width of the web 20 to prevent curling of the edges of the web 20 and belt 40**.

The drive means for the conveying, transfer and embossing apparatus of FIG. 1 is generally shown as a block 76. As indicated by dashed lines 78, 80 and 84, the transfer roll 32, the exit turning roll 28 and the anvil roll 44 are all driven by the drive means 76. Also, as indicated by dashed line 82, the embossing roll 54 is initially driven, but the drive is removed when the embossing roll 54 has built up speed. The speed of the transfer roll 32, the exit turning roll 28 and the anvil roll 44 are controlled so that the speed of the web on the belt 40 is about 1% greater than the speed of the web on the conveyor 22 and so that the speed of the web 20 out of the nip of embossing roll 54 is about 1% greater than the speed of the web on the belt 40. The conveying, transfer and embossing apparatus of FIG. 1 has been operated at embossing speeds of about 700 feet per minute. Depending on the strength of the formed web 20, it is believed that the apparatus of FIG. 1 can be beneficial at web 20 speeds in excess of 300 feet per minute.

Figure 2:
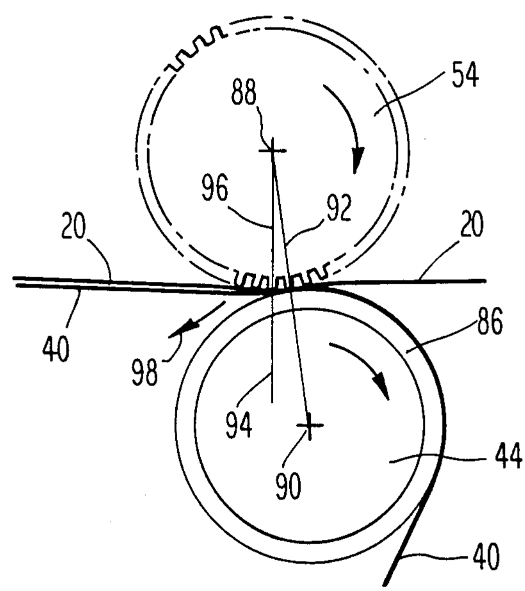
FIG. 2 is a side elevational schematic illustrating a preferred embossing roll configuration.

Referring now to FIG. 2, there is shown a preferred construction of the embossing roll 54 and the anvil roll 44. In a preferred embodiment, the anvil roll 44 has a resilient surface 86. As previously described, it is desirable for the belt 40 and the formed web 20 to contact the embossing roll 54 before the belt 40 and web 20 passes through the nip formed by the embossing roll 54 and the anvil roll 44. In order to reduce the slope of the belt 40 as it approaches the embossing nip, the rolls are mounted so that the line 92 connecting the center 88 of the embossing roll 54 with the center 90 of the anvil roll 40 forms a 10° angle with vertical line 94; and radial line 96 which is perpendicular to the tangent of belt 40 with embossing roll 54 forms an angle of 5° with vertical line 94. This allows the web 20 to contact the embossing roll 54 ahead of the embossing nip so that air being squeezed out of the web 20 by the embossing roll 54 can escape, as indicated by arrow 98, through the pores 41 in the belt 40.

Figure 3:
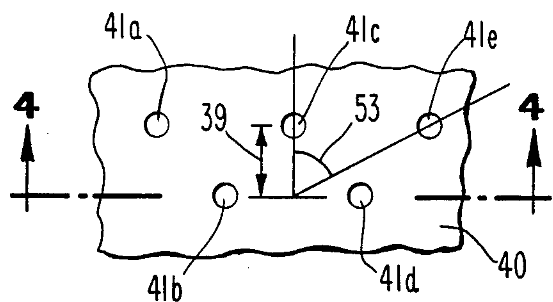
FIG. 3 is a partial plan view of a conveyor belt used in the apparatus of FIG. 1.
Figure 4:
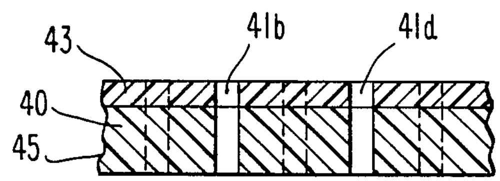
FIG. 4 is a section taken along the line 4—4 of FIG. 3.

The belt 40 must be a porous, stable, relatively inelastic material. The belt 40 must have a good release characteristic, that is to say that after the web 20 and the belt 40 emerge from the embossing nip, the cohesive force between the surface of the belt 40 and the surface of the web 20 must be less than the strength of the web 20. It is preferred that the width of the belt 40 be about equal to the width of the web 20 to prevent damage to the belt by the hot embossing roll 54. By stable, it is meant that over a minimum life of 168 hours for a belt 40, the width will not change by more than 5% and that the thickness of the web will not vary in a non-uniform manner. The preferred belt is a type TU-16 manufactured by Habasit Belting, Inc., 3453 Pierce Drive, P. O. Box 80507, Chamblee, Ga. 30366. The preferred belt, as depicted in FIGS. 3 and 4, has a polyamide body 45 and a polyurethane coating 43. The exposed surface of the polyurethane coating 43 is the conveying surface for the web 20. As an indication of the relative inelasticity of the belt 40, the TU-16 belt will elongate about 1% when subjected to a pull of 42 lbs. per inch. Belts that elongate more than 3% when subjected to a pull of 42 lbs. per inch are not considered to be inelastic as defined by the invention. Other parameters of the TU-16 belt are: nominal thickness, 0.07 inches; weight, 0.39 lbs. per square foot; and tensile strength, 2400 lbs. per inch; and the thickness should not vary by more than plus or minus 0.002 inches over a single fabricated belt. The pores 41 of the belt is provided by a pattern of round holes 41*a*-*41e*, punched in a uniform pattern, over the entire surface of the belt. The diameter of holes 41*a*-*41e* is 0.125 inches and the spacing between adjacent rows of holes as indicated by the line 39 is 0.375 inches. The holes in adjacent rows are staggered such that the angle indicated by the arc 53 is 60°. This hole pattern provides about 10% open area in the belt 40.

The resilient surface that is preferred in combination with the TU-16 belt is a Hypolon type compound (sold under the Trademark Black Max), one inch thick, having a P&J hardness of 35-40 as fabricated by Stowe-Woodward Company, 181 Oak Street, Newton, Mass. 02164.

While the present invention has been described with reference to a specific embodiment thereof, it will be obvious to those skilled in the art that various changes and modifications may be made without departing from the invention in its broader aspects.

What is claimed as new and desire to secure by Letters Patent of the United States is:

1. Apparatus for transferring and conveying a dry-formed nonwoven web through an embossing nip comprising:

(a) a stable, inelastic, porous endless belt having an upper surface for receiving and conveying the web;

(b) means for moistening the web while it is on the belt;

(c) a heated embossing roll;

(d) an anvil roll, located beneath the embossing roll, forming the embossing nip with the embossing roll, the embossing roll being mounted with respect to the anvil roll so that the web and the belt passes directly under the center of the embossing roll before passing directly over the center of the anvil roll;

(e) means for guiding the web and belt into the embossing nip so that the web and belt partially wraps the embossing roll before entering the embossing nip whereby air in the web is forced through the porous belt; and (f) means for driving the belt, embossing roll and an avil roll at a speed greater than 300 feet per minute.

2. The apparatus of claim 1 wherein the anvil roll has a resilient surface.

3. The apparatus of claim 1 wherein the surface of the belt contacting the web is hard polyurethane.

4. The apparatus of claim 1 wherein the body of the belt is a polyamide.

5. The apparatus of claim 1 wherein the formed web is transferred from a conveyor as it passes over an exit turning roll onto the belt as it is passing over an entrance turning roll, further comprising:

(a) a rotating transfer roll located adjacent the exit turning roll and the entrance turning roll;

(b) a vacuum box within the transfer roll for transferring the web from the conveyor to the surface of the turning roll; and (c) a vacuum box in the entrance turning roll for transferring the web from the turning roll to the belt.

6. The apparatus of claim 5 wherein the width of both vacuum rolls is greater than the width of the web to prevent curling of the web.

7. The apparatus of claim 5 wherein the roll vacuum box has an incoming edge located so that the web passes under the vacuum box before it enters the nip line formed by the transfer roll and the exit turning roll.

8. The apparatus of claim 5 wherein the transfer roll vacuum box has an outgoing edge located so that the web leaves the vacuum box just before or as it enters the nip line formed by the transfer roll and the entrance turning roll.

9. The apparatus of claim 5 wherein the entrance turning roll vacuum box has an incoming edge located so that the web passes over the turning roll vacuum box before it enters the nip line formed by the transfer roll and the entrance turning roll.

10. The apparatus of claim 5 wherein the entrance turning roll vacuum box has an outgoing edge located so that the belt and the web separate from the entrance turning roll before passing over the outgoing edge whereby air and fibers within the belt can be pulled through the entrance turning roll vacuum box.

11. The apparatus of claim 3 wherein the formed web is transferred from a conveyor as it passes over an exit turning roll onto the belt as it is passing over an entrance turning roll, further comprising:

(a) a rotating transfer roll located adjacent the exit turning roll and the entrance turning roll;

(b) a vacuum box within the transfer roll for transferring the web from the conveyor to the surface of the turning roll; and (c) a vacuum box in the entrance turning roll for transferring the web from the turning roll to the belt.

12. The apparatus of claim 11 wherein the width of both vacuum rolls is greater than the width of the web to prevent curling of the web.

13. The apparatus of claim 12 wherein the roll vacuum box has an incoming edge located so that the web passes under the vacuum box before it enters the nip line formed by the transfer roll and the exit turning roll.

14. The apparatus of claim 13 wherein the transfer roll vacuum box has an outgoing edge located so that the web leaves the vacuum box just before or as it enters the nip line formed by the transfer roll and the entrance turning roll.

15. The apparatus of claim 14 wherein the entrance turning roll vacuum box has an incoming edge located so that the web passes over the turning roll vacuum box before it enters the nip line formed by the transfer roll and the entrance turning roll.

16. The apparatus of claim 15 wherein the entrance turning roll vacuum box has an outgoing edge located so that the belt and the web separate from the entrance turning roll before passing over the outgoing edge whereby air and fibers within the belt can be pulled through the entrance turning roll vacuum box.

17. The apparatus of claim 16 wherein the surface of the belt contacting the web is hard polyurethane.

18. The apparatus of claim 17 wherein the body of the belt is a polyamide.

* * * * *